F. T. GOODWIN.
COMBINED FRICTION AND POSITIVE CLUTCH.
APPLICATION FILED MAR. 28, 1912.

1,044,515.

Patented Nov. 19, 1912.

Witnesses.

Inventor.

UNITED STATES PATENT OFFICE.

FRANK T. GOODWIN, OF TORONTO, ONTARIO, CANADA.

COMBINED FRICTION AND POSITIVE CLUTCH.

1,044,515.  Specification of Letters Patent.  Patented Nov. 19, 1912.

Application filed March 28, 1912.   Serial No. 686,755.

*To all whom it may concern:*

Be it known that I, FRANK T. GOODWIN, of the city of Toronto, county of York, Province of Ontario, Canada, a subject of the King of Great Britain, have invented certain new and useful Improvements in Combined Friction and Positive Clutches, of which the following is a specification.

My invention relates to improvements in combined friction and positive clutches, and one of the objects of my invention is to construct an article of the class described, mostly out of cast iron, thereby reducing greatly the cost of manufacturing articles of this class.

Another object of my invention is to prevent any of the elements binding against each other so that both the positive and friction clutches can be operated at all times with the minimum exertion of power.

A still further object of my invention is to design an article of this class so that there will be substantially no unnecessary freedom of movement between the parts to cause rattling thereof, and unnecessary wear.

Another object of my invention is to provide a buffer so that when the clutch is fully thrown out of gear, none of the parts thereof will be brought suddenly into contact with a fixed stop, thus reducing to a minimum wear and tear on the article from this source.

A still further object of my invention is to provide positive locking-means for the positive clutch when the same is not in action, thereby enabling the friction clutch to be freely operated without danger of the positive clutch operating when not required.

Further objects of my invention will be pointed out in the following specification.

In the embodiment illustrated, the invention consists of a load-shaft to which is keyed a friction disk; a power-shaft held in alinement with said load-shaft; a friction sleeve keyed to said power-shaft and associated with friction means coacting with a friction ring-plate; means carried by a thrust spool having bearing against said power-shaft, whereby the friction clutch is operated; a slotted sleeve inter-fitting with said thrust spool, and having bearing on said power-shaft, and carrying a bolt; means for locking said slotted sleeve and its bolt in normal position; means coacting with said thrust spool whereby the locking means for said slotted sleeve is released to permit springs to move said bolt into a hole carried by said friction disk, thereby positively clutching the said load-shaft to the said power-shaft; means carried by said thrust spool and designed to abut against said friction sleeve when the friction clutch is thrown on so as to prevent releasing movement of the levers and links of said friction clutch when the same is in operation, and spring-controlled means mounted on said load-shaft designed to keep snugly in position the means or thrust collar for operating the said clutch, as hereinafter more particularly explained.

In the drawings, like characters of reference indicate corresponding parts in each figure.

The combined friction and positive clutches with which I am acquainted are almost entirely made of steel, and are consequently expensive. Furthermore the parts thereof are loosely associated, so that there is considerable impact between certain of the parts, particularly when the friction clutch is released and the positive clutch thrown into gear. This impact results in considerably battering the inter locking parts of the positive clutch, with consequent necessity of repair. Now by holding all the parts of my clutch as snugly together as possible I permit them to have the necessary range of movement and at the same time prevent any possibility of sudden engagement between any of the parts sufficient to batter them. As the friction clutch must always be first thrown into gear before my positive clutch can be thrown into gear, it will be understood that the bolt of my positive clutch will be shot into its associated hole in the friction sleeve as it is brought into alinement therewith by reason of the slipping of the friction clutch on account of the load being too great for the same. The construction described prevents the positive clutch being suddenly thrown into gear.

The most important parts of my invention reside in the combination of the slotted sleeve with the thrust spool, these parts being constructed so that they inter-fit in such a manner that the thrust spool has bearing on the power shaft, and has clearance with said slotted sleeve so that if any of the parts of my article be under more strain than any of the other parts, there will be no possibility of the thrust spool binding against the slotted sleeve, and therefore the said slotted sleeve together with its bolt may be freely moved. Combined with the slotted sleeve just described, is positive means for locking the same in its normal position. Although I describe these parts and claim them in combination with the construction disclosed of the other elements, it must be understood that I do not confine myself to using the said parts necessarily in combination with any particular construction of clutch they may be capable of being used with.

Although I have illustrated in the drawings my invention applied as a shaft coupling, still it can be adapted equally for use as a pulley clutch.

It will be noticed from the following specification that only one lever is used to operate both the positive and friction clutches, and that my friction clutch as well as my positive can be both in action at the same time.

The friction clutch is of course used to pick up the speed of the unloaded load-shaft gradually, and when the load of the load-shaft is too great for the friction clutch, the positive clutch is thrown into gear.

Figures 1, 2, 7, 8:
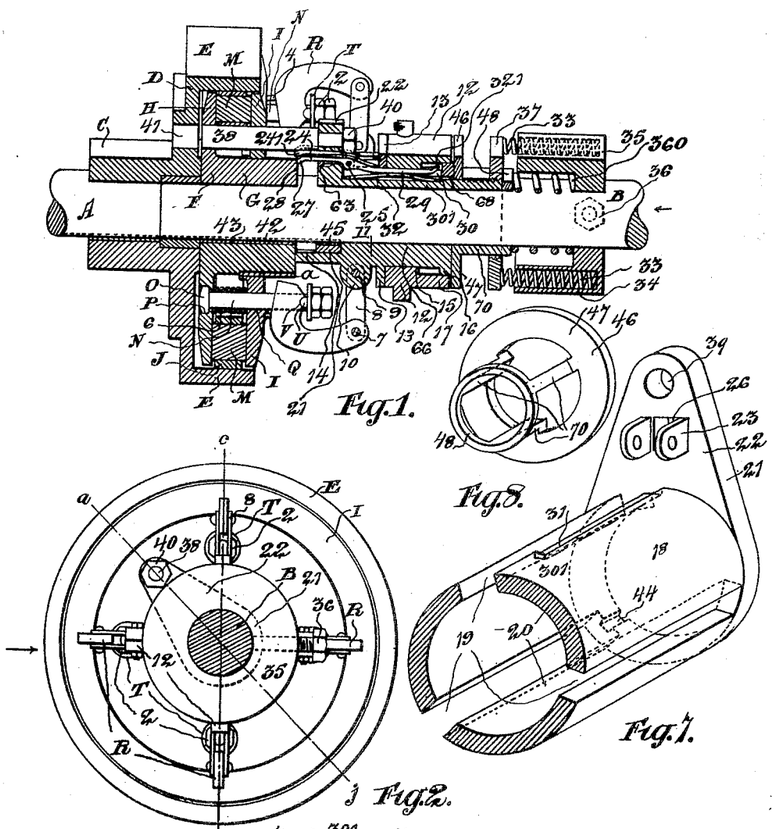
Figure 1 is a longitudinal section on the line $a$—$j$, Fig. 2.
Fig. 2 is an end elevation of my clutch looking in the direction indicated by arrow in Fig. 1.
Fig. 7 is a perspective view, on an enlarged scale, of the slotted sleeve (partly shown in section) which carries the bolt forming the positive clutch.
Fig. 8 is a perspective view of a spool hereinafter described.
Figures 3, 4, 5, 11:
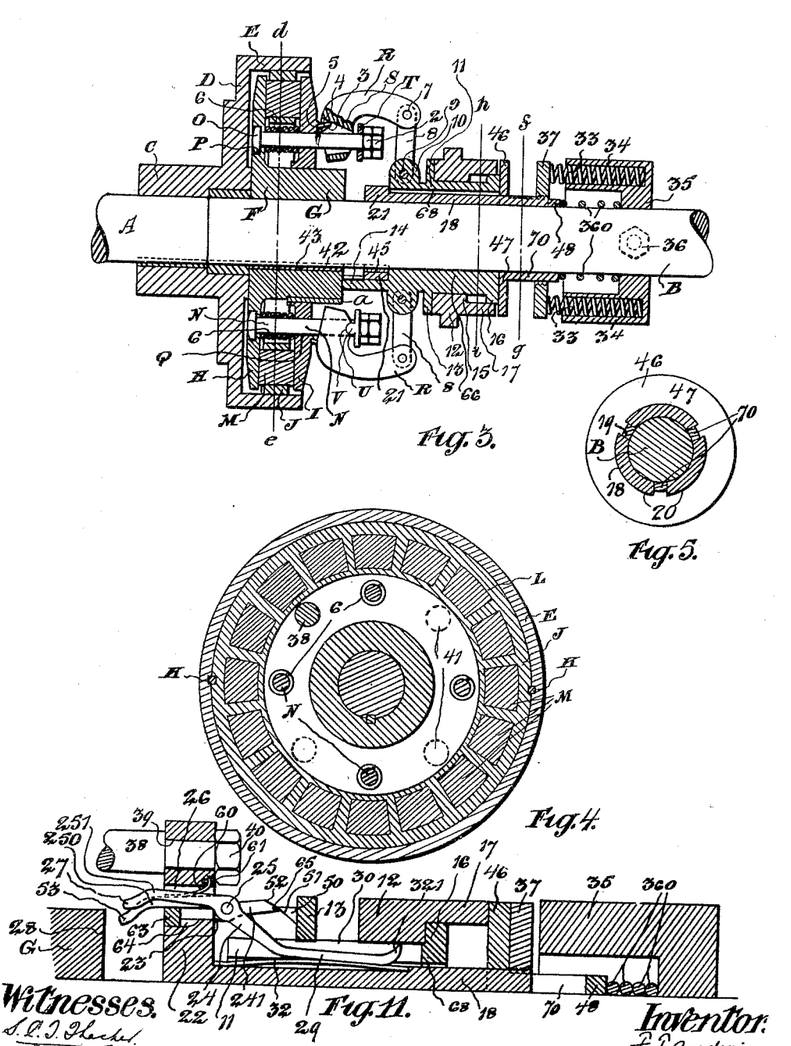
Fig. 3 is a longitudinal section on line $c$—$b$, Fig. 2.
Fig. 4 is a vertical cross section on the line $d$—$e$, Fig. 3.
Fig. 5 is a vertical cross section on the line $f$—$g$, Fig. 3.
Figs. 10 and 11 are views similar to Fig. 9, except that the parts illustrated therein are shown in different positions.

In Figs. 1 and 3, the friction clutch is illustrated as in operation.

A is the load-shaft and B the power-shaft held in alinement therewith. Keyed to the load-shaft A is a hub C which is integrally provided with a friction disk D which is integrally provided with a flange E projecting beyond one side thereof. Keyed to the power-shaft B is a friction member F consisting of a hub G with which is integrally-formed a flange H, which flange is overhung by the flange E. Splined on the hub G is a friction ring-plate I. Fitting against the inner surface of the flange E is a ring J, and these parts are connected together by the keys K. The ring J is provided with a plurality of holes L, in which are held blocks M preferably made of wood or red-fiber. These blocks M project beyond each side of the ring J, and upon referring particularly to Figs. 1 and 3 it will be noticed that the said blocks and ring J are positioned between the flange H and ring-plate I. N are a plurality of rods held by their heads O in holes P formed in the flange H. The said rods also extend through the holes Q formed in the friction ring-plate I.

R are a plurality of levers each associated with one of the rods N. These levers are provided with slots S through which the said rods extend. On each rod and near the outer end thereof is positioned a washer T provided with two oppositely placed bosses U. These bosses each operate in a recess V formed in the levers R. 2 are nuts on the end of each rod N locking the said washers in position. Associated with each lever R and held in a pocket 3 formed in each lever, is a link 4. The said links are also each mounted in a pocket 5 formed in the friction ring-plate I, and by means of the construction described the said levers have pivotal connection with said ring-plate I. Mounted on each rod N is a spring 6 confined between the flange H and the ring-plate I. Pivoted to the free end of each of the levers R by the pins 7 are links 8 which are pivoted by their pins 9 to the bosses 10 carried by the thrust spool 11. The parts I have described I lay no claim to, as they are already well-known. By well-known means the thrust collar 12 is moved against the flange 13 carried by the thrust spool 11, and so consequently moves this thrust spool to the left thereby, through the links 8, rocking the levers R on their bosses U, resulting in the movement of the friction ring-plate I against the blocks M, and as these blocks are held in their respective holes L, they, as well as the ring J, are moved (the manner in which the flange E and ring J are connected together by the keys K permit transverse movement of the said ring J) until the said blocks abut against the flange H and as the friction ring-plate I will be jammed tightly against the blocks M, it follows that the power-shaft B will be frictionally coupled to the load-shaft A in the position of the parts just described. The pins 9 are slightly in advance to the left, of the pins 7 when the friction clutch is jammed home, and it will be understood by one skilled in this art that were the thrust spool 11 allowed any further movement to the left it would move the pins 9 farther in that direction, and the levers R would be moved by their pins 7 and associated links to release the friction clutch. Therefore in order to prevent any possibility of the friction clutch being released when the parts are moved into the position illustrated in Figs. 1 and 3, I provide the thrust spool 11 with a lip 14 which will contact with the hub G when the friction clutch is fully thrown on. In order to release the friction clutch, the thrust collar 12 is moved far enough to the right so that the internal annular shoulder 15 thereof will come into contact with the annular flange 16 of the thrust spool 11, thus through the links 8 releasing the pressure of the levers R against the friction ring-plate I (which ring-plate is splined on the hub G by the key a), when immediately the springs 6 force the said ring-plate I out of contact with the blocks M and so throw off the clutch. Upon referring particularly to Figs. 1 and 3 it will be seen that the formation of the annular shoulder 15 provides the thrust collar 12 with a flange 17 which operates over the annular flange 16 of the thrust spool 11.

Figure 6:
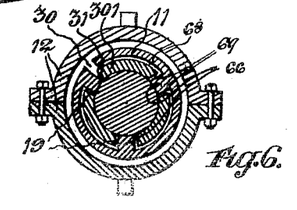
Fig. 6 is a vertical cross section on the line $h$—$i$, Fig. 3.

Mounted on the power-shaft B, is a sleeve 18 which is provided with a plurality of slots 19 dividing the sleeve longitudinally into a number of segmental sections 20. These sections are secured to, or formed a part of, the head 21 which is integrally provided with an extension 22. The extension 22 is provided with a pair of lugs 23 between which is positioned the dogs 24 and 241. 25 is a pin passing through said dogs and having bearing in the said lugs 23, and whereby the said dogs are held in position. The heads 250 and 251 of the dogs operate through the slot 26 formed in the extension 22. The nose 27 of the dog 24 is in contact with the annular shoulder 28 of the hub G at certain times. The stem 29 of the dog 24 operates between the thrust collar 12 and the thrust spool 11, and to accommodate this stem 29 the said thrust spool is provided with a longitudinal slot 30, shown particularly in Figs. 1, 6, and 13.

Figures 9, 10, 12, 13:
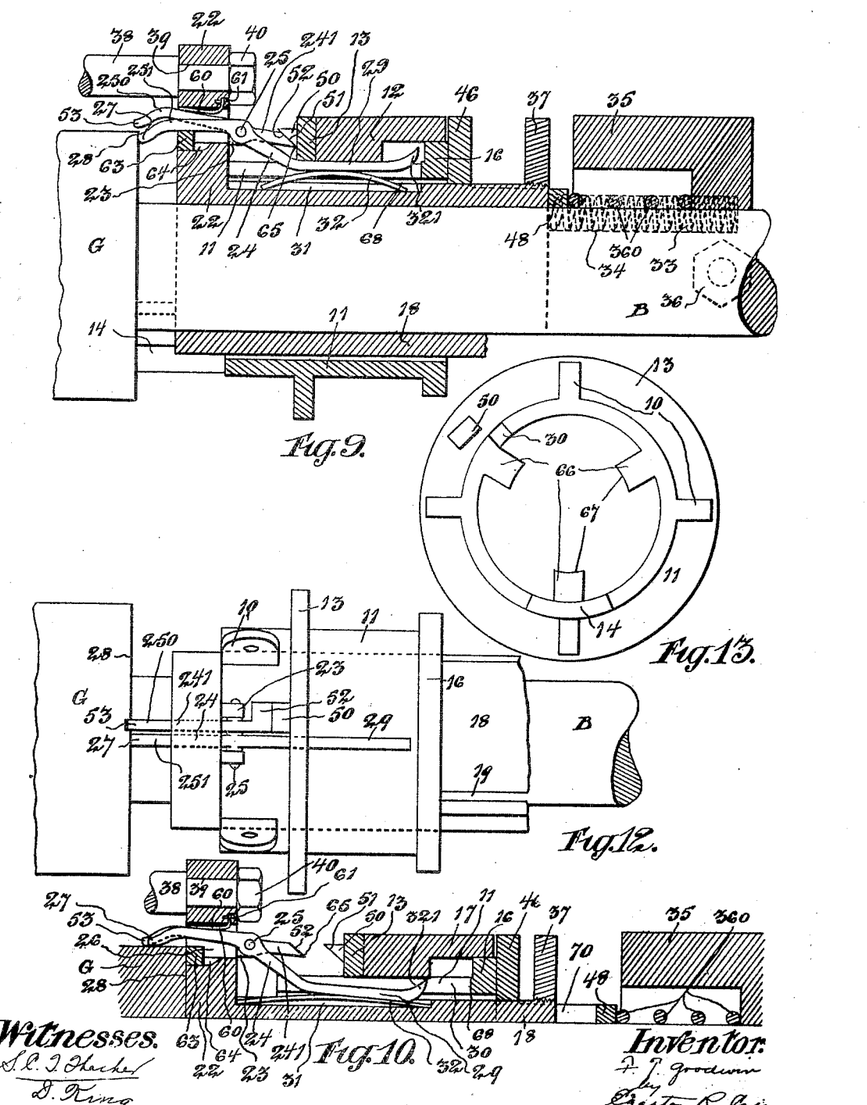
Fig. 9 is a longitudinal section through certain parts of my clutch on the line $a$—$j$, Fig. 2, showing, on an enlarged scale, more clearly the locking dogs for the slotted sleeve.
Fig. 12 is a plan view of the thrust spool together with the dogs for the slotted sleeve, showing the relative positions of these parts in respect to certain other parts, when the positive clutch is out of operation, certain parts being omitted.
Fig. 13 is an elevation of one end of the thrust spool.

Formed in the segmental section 301 of the sleeve 18 is a longitudinal groove 31 constructed to receive the leaf spring 32 which operates against the stem 29 of the dog 24 to keep the nose thereof, in normal position to abut against the annular shoulder 28 of the hub G at certain times. In order to throw the positive clutch into operation, (before this can be done the friction clutch must be on) the thrust collar 12 is moved to the right far enough so that the internal annular shoulder 15 thereof will come into contact with the outward-formed tail 321, of the dog 24, thus moving this dog so as to bring its nose 27 out of contact with the annular shoulder 28 of the hub G. Immediately this operation takes place, the springs 33 mounted in pockets 34 formed in the collar 35 (which collar is secured to the power-shaft B by the set-screw 36) and normally held in compression against the flange 37 carried by the sleeve 18, shoots this sleeve to the left, thereby moving the bolt 38 (mounted in the hole 39 of the extension 22, and locked therein by the nut 40), into one of the holes 41 formed in the disk D. It will now be understood that by means of my invention the positive clutch may be thrown into gear when the friction clutch is on. The described positions of the dog 24 and the sleeve 18 are as illustrated in Fig. 10.

The head 21 of the sleeve 18 is provided with a key-way 44 in which is held the key 45, which has sliding movement in the key-way 42.

46 is the flange of the spool 47, which spool is mounted on the shaft B. 360 is a coiled spring mounted on the shaft B, and the same is confined between the collar 35 and the ring 48 of the spool 47. This spring keeps the flange 46, against or close to flange 17 of the thrust collar 12, according to the relative positions of the said parts, to keep this thrust collar from having too much movement, and so keep the same from rattling. When the nose 27 of the dog 24 rides upon the hub G, the head 21 is resting against the hub G, and the parts occupy the position illustrated in Fig. 10.

In order to throw off the clutches, the thrust collar 12 is moved to the right thus bringing the flange 17 thereof into contact with the flange 46. In due course the flange 46 will come into contact with the flange 37 carried by the sleeve 18, thus moving this sleeve and its bolt 38 to the right resulting in the withdrawal of the bolt 38 from one of the holes 41. This movement results in moving the parts so that the annular shoulder 15 of the thrust collar 12 will be moved to position the tail 321 of the dog 24 underneath this thrust collar, occupying a position similar to that illustrated in Fig. 11. In this position of the dog 24, it will be seen that the nose 27 of this dog is held above the annular shoulder 28, and some positive means must be employed to prevent the positive clutch from being accidentally thrown into gear before the friction clutch. Secured to, or formed a part of, the flange 13 of the thrust spool 11 is a lug 50 having a beveled underside 51 which coacts with the beveled tail 52 of the dog 241. When the movement just described occurs for the withdrawal of the bolt 38 from one of the holes 41, it must be remembered that the friction clutch is still on, and therefore the thrust spool 11 is locked from longitudinal movement on the shaft B. The position of the flange 13 when the bolt 38 is withdrawn, as described, is illustrated in Figs. 1 and 10, and during the said movement the tail 52 of the dog 241 is brought into contact with the lug 50 and consequently tilted upward around its pin 25. The annular shoulder 15 is positioned the desired distance from the annular flange 16, and the tail 52 of the dog 241 comes in contact with the said lug 50 before the shoulder 15 contacts with the shoulder 16. So soon as the shoulder 15 contacts with the shoulder 16, the thrust spool 11 is moved to the right into the position illustrated in Fig. 11, thereby through the links 8 of levers R, and their associated parts throwing the friction clutch out of gear.

As a result of the described movement of the thrust collar 12 and thrust spool 11 (the flange 16 forms part of said thrust spool) the lug 50 is moved into the position illustrated in Fig. 11, thus allowing the spring 60 operating in the slot 26, and against the dog 241, to move this dog down into the position illustrated in Fig. 11, thus positively preventing the sleeve 18 and its bolt 38 from moving far enough to the left to permit said bolt to enter one of the holes 41. The nose 53 of the head 250 of the dog 241 is longer than the head 251 of the dog 24. When the operator has thrown off the clutches, and removed his hand from the lever (not shown) for moving the thrust collar 12, the springs 33 and 360 coacting respectively with the flange 37 and ring 48, shoot the sleeve 18 to the left, thus bringing the nose 53 of the dog 241 into contact with the annular shoulder 28 of the hub G, and so positively locks the sleeve 18 from moving to the left. As the flange 46 is being moved to the left. it moves to the left the thrust collar 12, thus moving the shoulder 15 to the left of the tail 32, of the dog 24, permitting the spring 32 to force this dog into normal position with the result that the path of movement to the left of the nose 27 of this dog will be obstructed by the shoulder 28 of the hub G. It must be remembered that during the described movement, the thrust spool 11 is held by the links 8 and levers R and springs 6 against unintentional movement to the left on the shaft B, and therefore the tail 52 of the dog 241 will be moved to the left away from the lug 50.

61 is a screw for securing the spring 60 to the extension 22 of the head 21.

63 is a stop secured in the key-way 64 formed in the bottom of the slot 26. The height of this stop 63 is such that the dogs 24 and 241 will contact therewith and so be limited in the extent of their movement under the influence of their respective springs. It will therefore be understood that the nose 65 of the dog 241 will be in the path of movement of the lug 50. Therefore when the thrust collar 12 is moved to the left far enough to contact with the flange 13, and through this flange move the thrust spool 11, and so throw in the clutch, the dog 241 is moved into the position illustrated in Figs. 1 and 9, out of contact with the annular shoulder 28, and so therefore there will be no danger of the positive clutch being locked by the dog 241 at the wrong time.

Since the nose 53 of the dog 241 is longer than the nose 27 of the dog 24, it will be understood that when the spring 32 operates to move the dog 24 into the position illustrated in Figs. 1 and 9, there will be no danger of the nose 27 binding against the annular shoulder 28, because when the dog 24 is being moved into the position described, the sleeve 18 is locked from moving to the left by the dog 241. Of course when the dog 241 is tripped as the friction clutch is thrown on, the springs 33 will move the sleeve 18 and so bring the nose 27 in contact with the annular shoulder 28.

42 is a key-way formed in the power-shaft B, in which is securely held the key 43 for the hub G.

In the foregoing part of this specification I have set forth very clearly the operations of the parts of my invention, and the same will be thoroughly understood by one skilled in this art.

From the foregoing specification it will be understood that the springs 33 and 360 act as a buffer in combination with the collar 35, and that when the parts are moved to the extreme limit of their movement to the right as illustrated in Fig. 11. the flange 37 will not contact with the collar 35.

As before described one of the objects of my invention is to prevent the thrust spool 11 and sleeve 18 binding. In order to prevent these parts binding, the said thrust spool is provided with a plurality of ribs 66 corresponding in number to the slots 19 of sleeve 18, and these ribs operate in the said slots with the sides of which they have clearance. The inner surfaces 67 of the said ribs 66 are segmental in shape so that the said ribs may have bearing against the shaft B. Upon referring particularly to Fig. 6 it will be noticed that there is a clearance 68 between the outer surface of the segmental sections 20 and the thrust spool 11, as well as a clearance 69 between the sides of the slots 19 of the segmental sections 20, and the sides of the ribs 66. Since the bolt 38 rests in the holes 68 and 69 formed respectively in the flange H and ring-plate I, and as these parts are keyed to the shaft B, it will be understood that the sleeve 18 is held circumferentially in a fixed relationship to the shaft B. By means of the links 8 and levers R and other connected parts, the thrust spool 11 is held in a fixed relationship circumferentially in respect to shaft B, and therefore the said thrust spool nor the said sleeve 18 will come into contact. Therefore it follows that if either of the said parts be under any undue strain, they cannot bind against each other.

70 are a plurality of bars spaced apart, connecting the ring 48 and flange 46 together. These bars operate each in one of the slots 19, and against the shaft B. Upon referring particularly to Fig. 5, it will be noticed that the bars 70 are thinner than the segmental sections 20, and that the ring 48 (see Fig. 8) is of equal thickness with the said bars; this construction positions the outer surface of the said bars 70 and ring 48 below the outer surface of the segmental sections 20, and therefore it enables me when assembling the parts of my clutch to pass the flange 37 over the said ring 48 and bars 70 and screw it on the free end of the thrust spool 11.

While I have described what I consider to be the best embodiment of my invention, I desire it to be understood that the principles can be embodied in different forms, and I desire not to be limited beyond the requirement of the prior art, and the terms of my claims.

Upon referring to Fig. 12 it will be noticed that the tail 52 of the dog 241 is preferably wider than the dog is thick, thus providing a construction whereby the lug 50 will have a wide area of contact with the said tail so as to distribute the wear between these parts.

I shall now give a brief description of the operation of my clutch. In order to throw on the friction clutch, the thrust collar 12 is moved against the flange 13 of the thrust spool 11, thus moving this thrust spool so that through the medium of the links 8 and levers R and rods "N" and associated parts, the friction ring-plate I will coöperate with the flange H so that through the medium of the blocks M the said parts will be frictionally coupled to the friction disk D and so couple the shaft B to the shaft A. To throw on the positive clutch, the thrust collar 12 is operated to release the dog 24, and therefore the sleeve 18 is shot by the springs 33 and so positions the bolt 38 that in due course it will pass into one of the holes 41. In order to uncouple the clutch, the thrust collar 12 is moved to the left, and through the medium of the flanges 37 and 46, the sleeve 18 is moved so as to withdraw the bolt 38 from one of the holes 41 it occupies; this movement throws off the positive clutch. To throw off the friction clutch, the thrust collar 12 is moved so as to contact with the thrust spool 11 and through the medium of the links and levers associated therewith and their connected parts, the blocks M are relieved of the pressure exerted thereagainst by the ring-plate I and the flange H, and therefore these said blocks together with their connected parts readily rotate with the disk D without rotating the friction-clutch members. When the thrust-spool 11 is moved to throw on the friction-clutch, the lug 50 carried by the flange 13 thereof, comes in contact with the tail 52 of the dog 241 and so moves this dog into the position illustrated in Fig. 9, thus placing its nose 53 so that it will be above the shoulder 28 of the hub G. When it is desired to throw on the positive-clutch, the parts are operated as before described, and the dogs 241 and 24 occupy the positions illustrated in Fig. 10. When both clutches are thrown off, the spring 60 forces the dog 241 into the position illustrated in Fig. 11, so that the nose 53 thereof will contact with the shoulder 28 of the hub G to prevent the positive-clutch being thrown on before the friction-clutch.

What I claim as my invention is:

1. In a combined friction and positive clutch, the combination with a shaft to which is keyed a friction-disk; a second shaft held in alinement with the first-mentioned shaft; clutch-members carried by said second-mentioned shaft, and designed to coact with said friction-disk to frictionally clutch said shafts together, and means carried by said second-mentioned shaft and designed to be operated to throw said clutch-members into and out of contact with said friction-disk, of means for limiting the movement of the operating means for said clutch-members when the clutch is thrown on; a spring-pressed positive-clutch splined on said second-mentioned shaft; means carried by said positive-clutch and whereby when said operating means for said clutch-members comes into contact therewith, said positive-clutch will be operated to positively clutch said shafts together while said friction-clutch is on, and means whereby when said positive-clutch is thrust out of gear, the same will be locked in normal position.

2. In a combined friction and positive-clutch, the combination with a shaft to which is keyed a friction-disk; a second shaft held in alinement with the first-mentioned shaft; clutch-members carried by said second-mentioned shaft, and designed to coact with said friction-disk to frictionally clutch said shafts together; a thrust spool slidably mounted on said second-mentioned shaft and rotating therewith; means pivoted to said thrust spool and connected with said clutch-members whereby when said thrust-spool is moved in the required direction, said clutch members will be moved into contact with said friction disk, and means for operating said thrust-spool, of a lip carried by said thrust-spool, and designed to abut against a portion of said clutch-members to limit the inward movement of said thrust-spool when the clutch is thrown on; a spring-pressed positive-clutch splined on said second-mentioned shaft, and means locking said positive-clutch in normal position and released by said thrust-spool so that the said positive-clutch will coact with said friction disk to clutch said shafts together while said friction-clutch is on.

3. In a combined friction and positive-clutch, the combination with a shaft to which is keyed a friction-disk provided with a plurality of holes; a friction-ring carried by said friction-disk; a second-shaft held in alinement with the first-mentioned shaft; a flange-member keyed to said second-mentioned shaft and provided with a hole, and positioned on one side of said friction-ring; a ring-plate splined on said last-mentioned friction-member, and provided with a hole, and positioned on the other side of said friction-ring; a thrust spool slidably mounted on said second-mentioned shaft and connected with said clutch-members whereby when the said thrust-spool is moved in the required direction the friction-clutch will be thrown on, and means for operating said thrust-spool, of a lip carried by said thrust-spool and designed to abut against said friction-member to limit the inward movement of said thrust-spool when the friction-clutch is thrown on; a spring-pressed sleeve splined on said second-mentioned shaft, the same provided with an extension; a bolt carried by said extension and operating in the holes in said flange member and said ring-plate, and means locking said spring-pressed sleeve in normal position and released by said thrust spool so that at certain times said bolt will be moved into one of the holes carried by said friction-disk to positively lock the said shafts together.

4. In a combined friction and positive-clutch, the combination with a shaft to which is keyed a friction-disk provided with a plurality of holes; a friction-ring carried by said friction-disk; a second-shaft held in alinement with the first-mentioned shaft; a flange-member keyed to said second-mentioned shaft and provided with a hole, and positioned on one side of said friction-ring, and a ring-plate splined on said last-mentioned friction-member, and provided with a hole, and positioned on the other side of said friction-ring, of a thrust-spool slidably mounted on said second-mentioned shaft and provided with a plurality of inwardly-extending longitudinally-placed ribs, the inner edges of which have bearing on said second-mentioned shaft; means pivoted to said spool whereby the same is connected with said flange member and said ring-plate; a lip carried by said thrust-spool and projecting beyond the inner end thereof and designed to abut against said friction-member to limit the inward movement of said thrust spool when the friction-clutch is thrown on; a spring-pressed slotted sleeve splined on said second-mentioned shaft, the ribs of said thrust-spool being positioned each in its respective slot formed in said sleeve; an extension carried by the inner end of said sleeve; a bolt carried by said extension operating in the holes in said flange member and said ring-plate; spring-controlled locking-means carried by said sleeve designed to lock the same and its bolt from having sufficient inward movement to pass said bolt into one of the holes formed in said friction-disk, at certain times, and a thrust collar mounted on said thrust-spool, the whole being arranged to operate as set forth.

5. In a combined friction and positive-clutch, the combination with a shaft to which is keyed a friction-disk provided with a plurality of holes; a friction-ring carried by said friction-disk; a second-shaft held in alinement with the first-mentioned shaft; a flange-member provided with a hub keyed to said second-mentioned shaft and positioned on one side of said friction-ring, and a ring-plate splined on said last-mentioned friction-member, and provided with a hole, and positioned on the other side of said friction-ring, of a thrust-spool slidably mounted on said second-mentioned shaft, and provided with a plurality of inwardly-extending longitudinally-placed ribs, the inner edges of which have bearing on said second-mentioned shaft; means pivoted to said spool whereby the same is connected with said flange-member and said ring-plate; a lip carried by said thrust-spool and projecting beyond the inner end thereof, and designed to abut against the hub of said friction-member to limit the inward movement of said thrust-spool when the friction-clutch is thrown on; a spring-pressed slotted sleeve splined on said second-mentioned shaft, the ribs of said thrust-spool being positioned each in its respective slot formed in said sleeve and having clearance therewith, the said thrust-spool also having clearance with said sleeve; an extension carried by the inner end of said sleeve; a bolt carried by said extension operating in the hole in said friction-member; a pair of spring-controlled dogs pivoted to said extension and operating through a slot therein, one of said dogs being longer over all than the other, the stem of said longer dog resting in a slot formed in said thrust-spool, and the nose of said dog normally contacting with the hub of said friction-member to lock said bolt in normal position; a thrust collar mounted on said thrust-spool and provided with an internal annular shoulder, a flange on the thrust-collar positioned outwardly away from said shoulder; and means carried by said thrust-spool to normally keep the said shorter dog out of operative position at certain times, the said shorter dog being operated to lock the said sleeve and its bolt to prevent said bolt from being moved into the hole formed in said friction-disk when both clutches are out of gear, the whole being arranged to operate as set forth and for the purpose specified.

6. In a combined friction and positive-clutch, the combination with a shaft to which is keyed a friction-disk provided with a plurality of holes; a friction-ring carried by said friction-disk; a second-shaft held in alinement with the first-mentioned shaft; a flange-member provided with a hub keyed to said second-mentioned shaft and positioned on one side of said friction-ring, and a ring-plate splined on said last-mentioned friction-member, and provided with a hole, and positioned on the other side of said friction-ring, of a thrust-spool slidably mounted on said second-mentioned shaft, and provided with a plurality of inwardly-extending longitudinally-placed ribs, the inner edges of which have bearing on said second-mentioned shaft; means pivoted to said spool whereby the same is connected with said flange-member and said ring-plate; a lip carried by said thrust-spool and projecting beyond the inner end thereof, and designed to abut against the hub of said flange-member to limit the inward movement of said thrust spool when the friction-clutch is thrown on; a slotted sleeve splined on said second-mentioned shaft, the ribs of said thrust-spool being positioned each in its respective slot formed in said sleeve and having clearance therewith, the said thrust-spool also having clearance with said sleeve; an extension carried by the inner end of said sleeve; a bolt carried by said extension operating in the hole in said friction-member; a pair of spring-controlled dogs pivoted to said extension and operating through a slot therein, one of said dogs being longer over all than the other, the stem of said longer dog resting in a slot formed in said thrust-spool, and the nose of said dog normally contacting with the hub of said friction-member to lock said bolt in normal position; a thrust collar mounted on said thrust-spool and provided with an internal annular shoulder; a flange on the thrust-collar positioned outwardly away from said shoulder, and means carried by said thrust-spool to normally keep the said shorter dog out of operative position at certain times, the said shorter dog being operated to lock the said sleeve and its bolt to prevent said bolt from being moved into the hole formed in said friction-disk when both clutches are out of gear, a flange carried by the outer end of said sleeve; a pocket-provided collar carried by said second-mentioned shaft; a spring mounted in each of the pockets in said collar and normally resting against said flange, and spring-controlled means mounted on said second-mentioned shaft operating to keep said thrust-collar in normal position.

7. In a combined friction and positive-clutch, the combination with the first shaft to which is keyed a friction-disk provided with a plurality of holes; a second shaft held in alinement with said first-mentioned shaft, and friction members keyed to said second-mentioned shaft and coacting with said disk to frictionally couple said shafts together at certain times, of a thrust-spool mounted on said second-mentioned shaft and provided with a plurality of inwardly-extending ribs longitudinally placed and having their inner edges bearing against said shaft; a stop carried by said thrust-spool and designed at certain times to abut against one of said friction-members to limit inward movement of said spool when the friction-clutch is thrown on; a spring-controlled sleeve splined on said second-mentioned shaft and provided with a plurality of longitudinal slots in each of which operates one of the said ribs; a head carried by said sleeve; a bolt supported in said head; a pair of spring-controlled dogs pivoted to said head and operated through a hole therein, one of said dogs being shorter over all than the other, the shorter dog having a longer nose than the other dog, means carried by said spool whereby said shorter dog is permitted at certain times to lock said sleeve against movement toward said clutch-members, the longer of said dogs normally locking said spool against movement toward said clutch; a member mounted on said spool and designed to contact with stops carried by said spool to move said spool to throw on and off said friction-clutch and to control this operation of said shorter dog and to operate said longer dog to lock said sleeve and to withdraw said sleeve, and spring-controlled means carried by said second-mentioned shaft and bearing against said sleeve, as set forth and for the purpose specified.

8. In a combined friction and positive-clutch the combination with the first shaft to which is keyed a friction disk provided with a plurality of holes; a second-shaft held in alinement with said first-mentioned shaft, and friction-members keyed to said second-mentioned shaft and coacting with said disk to frictionally couple said shafts together at certain times, of a thrust-spool mounted on said second-mentioned shaft and provided with a plurality of inwardly-extending ribs longitudinally-placed and having their inner edges bearing against said shaft; a stop carried by said thrust-spool and designed at certain times to abut against one of said friction-members to limit the inward movement of said spool when the friction clutch is thrown on; a spring-controlled sleeve splined on said second-mentioned shaft and provided with a plurality of longitudinal slots in each of which operates one of the said ribs; a head carried by said sleeve; a bolt supported in said head; a pair of spring-controlled dogs pivoted to said head and operating through a hole therein, one of said dogs being shorter over all than the other, the shorter dog having a longer nose than the other dog, means carried by said spool whereby said shorter dog is permitted at certain times to lock said sleeve against movement toward said clutch-members, the longer of said dogs normally locking said spool against movement toward said clutch; a member mounted on said spool and designed to contact with stops carried by said spool to move said spool to throw on and off said friction-clutch and to control operation of said shorter dog and to operate said longer dog to lock said sleeve and to withdraw said sleeve, and spring-controlled means carried by the second-mentioned shaft and bearing against said sleeve, and a spring-controlled spool mounted on said second-mentioned shaft and normally held against the outer end of said thrust spool, as set forth and for the purpose specified.

9. In a combined friction and positive-clutch, the combination with the first shaft to which is keyed a friction-disk provided with a plurality of holes; a second shaft held in alinement with said first-mentioned shaft, and friction-members keyed to said second-mentioned shaft and coacting with said disk to frictionally couple said shafts together at certain times, of a thrust-spool mounted on said second-mentioned shaft and provided with a plurality of inwardly-extending ribs longitudinally placed and having their inner edges bearing against said shaft; a stop carried by said thrust-spool and designed at certain times to abut against one of said friction-members to limit inward movement of said spool when the friction-clutch is thrown on; a spring-controlled sleeve splined on said second-mentioned shaft and provided with a plurality of longitudinal slots in each of which operates one of the said ribs; a head carried by said sleeve; a bolt supported in said head; a pair of spring-controlled dogs pivoted to said head and operating through a hole therein, one of said dogs being shorter over all than the other, the shorter dog having a longer nose than the other dog; means carried by said spool whereby said shorter dog is permitted at certain times to lock said sleeve against movement toward said clutch-members, the longer of said dogs normally locking said spool against movement toward said clutch; a member mounted on said spool and designed to contact with stops carried by said spool to move said spool to throw on and off said friction clutch and to control operation of said shorter dog and to operate said longer dog to lock said sleeve and to withdraw said sleeve, a flange carried by the outer end of said slotted sleeve; a pocket-provided collar keyed to said second-mentioned shaft; a spring mounted in each of the pockets in said collar and resting against said flange; a spool provided with a flange; a plurality of bars integrally-formed with said flange spaced apart, said bars operating each in its associated slot formed in said slotted sleeve; a ring carried by said bars and surrounding said shaft, and a spring mounted on said shaft and between said ring and said collar, as set forth and for the purpose specified.

10. In a combined friction and positive-clutch, the combination with a first shaft to which is keyed a friction-disk provided with a plurality of holes; a second shaft held in alinement with said first-mentioned shaft, and friction-members keyed to said second-mentioned shaft and coacting with said disk to frictionally couple said shaft together at certain times, of a thrust-spool mounted on said second-mentioned shaft and provided with a plurality of inwardly-extending ribs longitudinally placed and having their inner edges bearing against said shaft; a stop carried by said thrust-spool and designed at certain times to abut against one of said friction-members to limit inward movement of said spool when the friction-clutch is on; means pivoted to said thrust-spool and coupled to certain of said friction-members whereby said thrust-spool is prevented from having circumferential movement on said second-mentioned shaft; a spring-controlled sleeve splined on said second-mentioned shaft and provided with a plurality of longitudinal slots opening through to one end thereof in each of which operates one of the said ribs; the said ribs and slots being of such relative sizes that there is a clearance therebetween, and between said thrust-spool and said sleeve; a head carried by said sleeve; a bolt supported in said head; a pair of spring-controlled dogs pivoted to said head and operating through a hole therein, one of said dogs being shorter over all than the other, said shorter dog having a longer nose than the longer dog; a lip carried by said spool whereby said shorter dog is permitted at certain times to lock said sleeve against movement toward said clutch-members; a thrust-collar mounted on said spool and provided with an internal annular shoulder normally spaced apart from a flange carried by said spool; a flange carried by said thrust collar overlapping the flange carried by said spool; a stop carried by said spool; the tail of said longer dog normally resting behind the flange carried by said thrust-collar; a flange carried by the outer end of said spool; a pocket-provided collar keyed to said second-mentioned shaft; a spring mounted in each pocket formed in said collar and normally resting against said flange carried by said sleeve, and a spring-controlled spool mounted on said second-mentioned shaft and held against the outer end of said thrust-spool, the whole being arranged as set forth and for the purpose specified.

11. In a combined friction and positive-clutch, the combination with a shaft to which is keyed a hub provided with a friction-disk having a hole; and a friction-member mounted on the said hub and coacting with said friction-disk, of a sleeve splined on said shaft and provided with a plurality of longitudinal slots opening through one end thereof; a head carried by said sleeve in which is carried a bolt operating in the hole formed in said disk; a thrust-spool provided with a plurality of ribs longitudinally placed, the said ribs operating each in its associated slot formed in said sleeve, the inner edges of said ribs having bearing against said shaft; the said ribs being constructed narrower than said slots and to extend beyond the outer surface of said sleeve, thereby providing clearance between these parts; means pivoted to said spool and connection with said friction-disk and its associated member whereby said thrust-spool is prevented from having circumferential movement on said shaft; a lip carried by said spool designed to abut against said hub at certain times; a pair of spring-controlled dogs pivoted to said head, one of said dogs being longer than the other, the nose of said shorter dog extending beyond the inner nose of said longer dog; the said dogs designed to alternately coact with said hub at certain times to lock said sleeve against movement toward said hub; means carried by said thrust-spool for operating said shorter dog; a member mounted on said thrust-spool and designed to move the same on said shaft, and to move said longer dog, and spring-controlled means mounted on said shaft designed to operate against said sleeve and said thrust-spool, as set forth as and for the purpose specified.

12. In a clutch, the combination with a shaft, and a member keyed thereto, of a sleeve splined on said shaft and provided with a plurality of longitudinal slots opening through one end thereof, and further provided with a head; a bolt carried by said head; spring-controlled locking means carried by said head and designed to lock said sleeve against said member from longitudinal movement on said shaft in a given direction; a thrust spool surrounding said sleeve and provided with a plurality of longitudinal inwardly-extending ribs which are positioned each in its respective slot formed in said sleeve, the said ribs being narrower than said slots and projecting beyond said sleeve thereby providing a clearance between said sleeve and said spool to prevent binding thereof; a plurality of springs carried by said shaft and operating against said sleeve for the purpose stated; means pivoted to said spool and to said member to cause said spool to rotate with the said shaft in fixed relationship to said sleeve, and unitary means whereby said sleeve and said spool are moved at certain times and whereby said locking means is tripped, as set forth and for the purpose specified.

In testimony whereof I have affixed my signature in presence of two witnesses.

FRANK T. GOODWIN.

Witnesses:
S. C. T. THACHER,
DOROTHY KING.